United States Patent
Penneau et al.

(10) Patent No.: US 6,962,745 B2
(45) Date of Patent: *Nov. 8, 2005

(54) POROUS COMPOSITE PRODUCT PARTICULARLY WITH HIGH SPECIFIC SURFACE AREA, METHOD FOR PREPARING AND ELECTRODE FOR ELECTROCHEMICAL ASSEMBLY FORMED WITH A POROUS COMPOSITE FILM

(75) Inventors: Jean-François Penneau, Avon (FR); François Capitaine, Pleuven (FR); Philippe Le Goff, Melun (FR)

(73) Assignee: Bollore, Quimper (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/367,081

(22) PCT Filed: Feb. 5, 1998

(86) PCT No.: PCT/FR98/00210

§ 371 (c)(1),
(2), (4) Date: Jan. 24, 2000

(87) PCT Pub. No.: WO98/34977

PCT Pub. Date: Feb. 5, 1998

(65) Prior Publication Data

US 2003/0157314 A1 Aug. 21, 2003

(30) Foreign Application Priority Data

Feb. 6, 1997 (FR) .............................. 97 01350

(51) Int. Cl.⁷ ................................. B32B 5/22
(52) U.S. Cl. ................................ 428/317.9; 428/315.5; 429/209; 429/212; 429/232; 429/231.8; 429/217
(58) Field of Search ............................ 428/304.4, 312.2, 428/317.7, 317.9, 318.4, 421; 429/217, 42, 43, 209, 212, 232, 231.8; 264/104, 105, 140; 361/271, 503, 508; 521/134, 142, 61; 524/365, 543

(56) References Cited

U.S. PATENT DOCUMENTS 3,407,096 A * 10/1968 Landi
3,407,249 A * 10/1968 Landi
3,673,278 A * 6/1972 Bialous .................... 525/147
3,852,113 A * 12/1974 Yokota et al. ............. 429/122
4,100,238 A * 7/1978 Shinomura .................. 264/49
4,190,707 A * 2/1980 Doi et al. ................... 429/254
4,309,494 A * 1/1982 Stockel ...................... 429/254
4,396,693 A * 8/1983 Bernstein et al. .......... 429/217
4,403,007 A * 9/1983 Coughlin ..................... 428/95
4,480,290 A * 10/1984 Constanti et al.
4,654,281 A * 3/1987 Anderman et al.
4,862,328 A * 8/1989 Morimoto et al. ......... 361/502
4,957,943 A * 9/1990 McAllister et al. .......... 521/64
5,143,805 A * 9/1992 Anderman et al. ........ 429/217
5,171,774 A * 12/1992 Ueno et al. ................. 524/495
5,451,454 A * 9/1995 Fukahori et al.
5,458,836 A * 10/1995 Rakestraw et al. ......... 264/169
5,538,811 A * 7/1996 Kanbara et al. ........... 429/307
5,665,442 A * 9/1997 Andersen et al. ......... 428/36.4
5,716,997 A * 2/1998 Toyosawa et al.
5,738,111 A * 4/1998 Weimer et al. ............ 128/849
5,811,205 A * 9/1998 Andrieu et al. ............ 429/137
6,097,587 A * 8/2000 Inagawa et al.
2003/0175494 A1 * 9/2003 Penneau et al.

FOREIGN PATENT DOCUMENTS

BE         693135       7/1967
WO         WO 96/20504 * 7/1996

OTHER PUBLICATIONS

Database WPI, Section Ch, Week 8230 JP 57–100142 A.

Patent Abstracts of Japan, vol. 16, No. 178, Apr. 28, 1992 JP 04–022062 A.

* cited by examiner

Primary Examiner—Hai Vo
(74) Attorney, Agent, or Firm—Blakely Sokoloff Taylor & Zafman

(57) ABSTRACT

A porous composite product in the form of a film with a high specific surface. Used in a wide range of electromechanical products especially in the field of selective membranes, packaging or catalysis. The porous composite product has a high homogeneity in the distribution of the filler and continuous structure. The product is capable of being obtained by extrusion.

17 Claims, No Drawings

POROUS COMPOSITE PRODUCT PARTICULARLY WITH HIGH SPECIFIC SURFACE AREA, METHOD FOR PREPARING AND ELECTRODE FOR ELECTROCHEMICAL ASSEMBLY FORMED WITH A POROUS COMPOSITE FILM

The invention relates to a porous composite product, in particular in the form of a film, in particular with a high specific surface, and to a process for the preparation of such a product.

It also relates to the precursor composite product of use in carrying out the said process.

It also relates to the application of the porous composite product in the form of a film as electrode for the entire range of electrochemical products and to the application in general of the porous composite product, with a high specific surface, in the field of selective membranes, of packaging or of catalysis.

Low density porous films are already known, in particular by Patent Application EP-A-283,187, which are obtained by spinning, at the melting temperature, a mixture of a first thermoplastic polymer and of a second thermoplastic polymer and then removing the second polymer by means of an appropriate solvent. Such a porous film can be used for various applications, in particular in the field of filtration or of separation.

Patent Application EP-A-430,439 discloses a process for improving the production of such films, in which a mixture of a first thermoplastic polymer and of a second immiscible thermoplastic polymer is extruded through a die and then removing the immiscible polymer by means of a solvent, the process being characterized in that a perforated barrier plate is interposed upstream of the die, so as to obtain a porous structure comprising a longitudinal region of low porosity and another longitudinal region of higher porosity.

Furthermore, polarizable electrodes are known which can be used in electrical capacitors of the double-layer type which are capable of being charged with, or of discharging, a large amount of electric charge.

The polarizable electrodes which can be used in supercapacitors are based on an ideally polarizable material which is light and which has a large exchange surface area, such as active charcoal, which is a carbonaceous material with a high specific surface, in particular greater than 1000 $m^2/g$.

For an electrode to exhibit the maximum efficiency, it must have a maximum proportion of active mass and an optimum accessibility to this mass. The latter property requires that it should have an open porous structure. This is the case, for example, with electrodes made of activated fabric: an active charcoal fabric is manufactured from a fabric based on viscose or on polyacrylonitrile, which fabric is carbonized and then activated.

However, such electrodes are expensive and exhibit a high and uneven thickness (generally greater than 300 $\mu m$). Furthermore, although such a production method makes it possible, at least in theory, to employ a spooling technology, it turns out in practice that such an operation is difficult to carry out.

Electrodes with a very high proportion of active mass (generally greater than 98%) can also be obtained by sintering. Active charcoal and various additives, in particular conducting black, are mixed mechanically with a liquid until a suspension is obtained. The solution obtained is poured over a filtering partition, which is placed under partial vacuum. After a certain time, all the components are deposited homogeneously on the filtering partition, whereas the liquid has passed through this partition. The partial vacuum creates a degree of cohesion between the components, equivalent to compacting under pressure. The electrode is the dry material recovered on the partition.

However, as above, this technology exhibits numerous disadvantages. In particular, it lends itself with difficulty to the use of a spooling technology and the thickness, homogeneity and evenness of the electrodes are difficult to control. Furthermore, the processes are limited in the choice of the polymers. In particular, polyolefins cannot be used.

The carbonaceous filler can also be mixed mechanically with a binding polymer in a small proportion, for example 3% of Teflon, until a very viscous paste is obtained, and then rolling in order to give a sheet which is cut up using a hollow punch in order to produce an electrode.

This process results in the same disadvantages as the preceding production methods.

A process for manufacture by coating is also mentioned, in which process the active filler and one or more additives, such as a binding polymer, are mixed with a solvent until a paste of controlled viscosity is obtained. The latter is coated onto a support sheet which can act subsequently as current collector. The sheet passes into an oven in order for the solvent to be evaporated.

The deposit can be relatively thin (down to a few microns) and homogeneous and the proportion of active mass is high.

It is nevertheless a process which is difficult to implement because of the possible use of solvents which can be toxic.

The electrodes in the form of films, in particular of polyolefin films, which make it possible to employ a spooling technology are also known.

These polarizable electrodes are based on a carbonaceous material, for example an active charcoal with a high specific surface, in particular at 1000 $m^2/g$, and on a binder, such as polyolefins, in particular polyethylene or polypropylene, or other polymers, such as polyesters, polycarbonates or polyimides.

Polarizable electrodes using a polyethylene or polypropylene binder and an active charcoal powder have been provided, for example (JP-A-22062/92).

However, polarizable electrodes based on a binder such as polyethylene or polypropylene exhibit a very low porosity.

Such phenomena also occur with the other binders cited above.

Document BE-A-693,135 discloses porous sheets of polytetrafluoroethylene entirely in the form of fibrils comprising conducting filler materials, such as graphite or a metal, up to 98% of the weight of the sheet.

This type of structure is obtained by mixing an aqueous dispersion of polytetrafluoroethylene particles with an extractable polymer, followed by milling. This milling constitutes a critical stage which results in the shearing of the polytetrafluoroethylene particles and the conversion of the particles into a network of elongated fibers. Extrusion is then carried out and then the extractable polymer is removed. The final structure exhibits pores of greater than 0.1 $\mu m$. These sheets can be used as electrode in fuel cells.

The abstract of Japanese document JP-A-57100142 discloses the production of a porous membrane which consists in extruding a mixture, by volume, of 15–60% of a polyolefin resin; 3–40% of a polyether; 20 to 80%, by volume, of an extractable, finely divided powder; and 0.5 to 10% of an insoluble powder and in then extracting the polyether and the extractable powder. The Applicant has confirmed that it is impossible by the process disclosed in this document to obtain sheets comprising a higher proportion of filler without seriously affecting the mechanical properties.

It would therefore be desirable to produce porous electrodes formed of a binder and of fillers, in particular with a high specific surface, which can be produced in a large amount which make it possible to employ a spooling technology.

The aim of the present invention is specifically to provide a solution to this technical problem.

One object of the present invention is to provide novel porous composite products having in particular a high specific surface.

Another object of the present invention is to provide composite films, in particular with a high specific surface, with a high content of fillers, which make it possible to employ a spooling technology.

Another object of the present invention is to make it possible to use a broad choice of polymers.

Another object of the present invention is to provide porous composite products or films which are inexpensive to manufacture.

Another object of the present invention is to make it possible to obtain products of varied shape, because of the extrusion technique used, which can be employed, such as pipes, rods, films or any other extruded object.

Another object of the present invention is to provide carbonaceous electrodes in the form of thin, homogeneous, ideally polarizable porous films which exhibit a very high proportion of active mass.

Another subject-matter of the present invention relates to the applications of the porous composite products as selective membrane, packaging films or insulating films.

The invention firstly relates to a porous composite product, in particular with a high specific surface, characterized in that it comprises a polymeric material and at least 20% of one or more fillers, in particular with a high specific surface, the said product being capable of being obtained by extrusion.

The expression "product" is intended to denote an assembly, the cohesion of which is sufficient for it to retain its integrity without being supported.

It is significant to note that the products according to the invention exhibit a novel structure because of the very high homogeneity of the distribution of the filler, in particular with a high specific surface, in the polymeric material and because of its continuous structure. Furthermore, the polymeric material is non-fibrillated.

This is one of the essential characteristics of the product according to the invention, as the Applicant has observed that a product which does not exhibit a sufficient homogeneity results in inadequate mechanical properties for the level of fillers indicated above.

The expression "capable of being obtained by extrusion" means that the composite product exhibits the characteristics of an extruded product.

In order for the product "capable of being obtained by extrusion" to exhibit the required homogeneity, it is necessary for this extrusion to be carried out on a mixture which is as homogeneous as possible. Such a homogeneous mixture can be obtained from a twin-screw extruder. Other appropriate mixers can also be used.

The products concerned are therefore fundamentally different from those which can be obtained by the coating technique as was described in the preamble of the description.

Preferably, one of the essential characteristics of the porous composite product according to the invention is that it exhibits a high specific surface.

The specific surface is evaluated by the "BET" measurement as described, for example, in the publication Technique de l'ingénieur [Art of the Engineer], Pbis 45-1 (Etude de structure—mesure de surface spécifique) [Structure study—measurement of specific surface), Jean Charpin and Bernard Rasneur.

The specific surface of the porous composite product according to the invention is greater than approximately 10 $m^2/g$ and preferably greater than 20 $m^2/g$. Advantageously, of between 20 $m^2/g$ and 100 $m^2/g$.

The porosity of the product is, by volume, greater than 5%. It is generally less than approximately 80%.

For applications in supercapacitors or accumulators, the porosity is generally between 15 and 50%.

This mean diameter of the pores is generally less than 1 $\mu$m. According to a preferred alternative form, the mean diameter of the pores is less than 0.5 $\mu$m, preferably less than 0.1 $\mu$m, advantageously less than 0.02 $\mu$m.

In the specific case of fluorinated polyolefins, the diameter of the pores is generally less than 0.5 $\mu$m. This is the case in particular with polytetrafluoroethylene.

In addition to the high BET specific surface and the mechanical properties, these products are noteworthy in that the electrochemical capacity is greater than 2 F/g, preferably greater than 10 F/g.

In the case of an electrode for a super-capacitor, capacitor, the desired porosity is mesoporous, whereas, in the case of Belgian Patent 693,135, which relates to an electrode for "fuel cell" application, the desired porosity must be open (macroporous) in order to allow a high fuel flow.

In the case of porous composite products in the form of films, it should be noted that these films exhibit noteworthy mechanical properties which allow them to be employed by the spooling technology. In general, these films exhibit a tensile strength at break of greater than 4 MPa, advantageous of greater than 6 MPa, at room temperature.

Mention may be made, among fillers, of carbons, such as graphites or carbon blacks with a low specific surface, metal oxides, silica or talcs.

Mention is in particular made, among fillers with a high specific surface which are suitable for the production of such composite products, of carbonaceous materials or inorganic and metallic particles with a high specific surface, such as, for example, Raney metals, rare earth metal oxides, porous ceramics, or perlites, zeolites or clays.

The properties required for a carbonaceous material are an expanded surface per unit of high weight, a low electrical resistance and good electrochemical chemical stability.

The carbonaceous materials can be provided in the form of powders and are obtained, for example, from oil pitch, phenolic resins, coconut shells and other organic products.

An active charcoal exhibits in particular a specific surface (BET) of between 300 and 3000 $m^2/g$, preferably of greater than 1000 $m^2/g$.

The polymeric material is formed of thermoplastic plastic elastomers or polymers which are insoluble in aqueous and/or organic solvents and which ensure the cohesion of the product (structural polymers or elastomers) and of thermoplastic polymers or elastomers with polar groups which remain in the product after the implementation of the manufacturing process which results in the said porous product or film.

Mention is in particular made, among insoluble elastomers or polymers, of polyolefins, such as polypropylenes, polyethylenes or copolymers of ethylene and of propylene. These polyolefins are such that they can be produced in the form of films and are well known in particular as packaging films. They are, for example, low or high density polyethylene optionally comprising, as copolymer, a greater or lesser proportion of an alpha-olefin.

They may also be polyamides, such as polyether-block-polyamides, polyimides, vinyl copolymers with a high proportion of ethylene monomers, such as poly(ethylene/vinyl acetate) with a high proportion of ethylene monomers, acrylic polymers, aromatic polymers, such as polystyrenes, for example polystyrene-butadiene copolymer, fluorinated polymers, such as poly(vinylidene fluoride), or copolymers formed from monomers belonging to one of the abovementioned families, for example vinylidene fluoride and hexafluoropropylene copolymers or vinylidene fluoride and trifluoroethylene copolymers.

The thermoplastic elastomers or polymers which are insoluble in the solvents are preferably chosen from the group of the polyolefins.

Mention is in particular made, among the soluble polymers, of polymers which are soluble in the following solvents: water, alcohols, dimethylformamide, dimethyl sulfoxide, tetrahydrofuran or acetone.

With the proviso, of course, that the degree of polymerization is appropriate to removal by solvent, the soluble polymers are in particular chosen from polyethers, such as polyoxyethylene or polyoxopropylene, propylene, or polyalcohols, such as poly(vinyl alcohol) or ethylene-vinyl alcohol copolymers. Mention is in particular made, among these polymers, of those for which the molecular mass is between 200,000 and 1,000,000, advantageously polyethers.

Mention is also made of polymers which can be calcined according to the usual methods.

The calcinable polymers correspond to the polymers which are soluble in the solvents mentioned above and can also be chosen from polymers with a decomposition temperature below that of the structural polymer or elastomer, for example cellulose.

The choice of these polymers can be made in a known way by simple tests within the scope of a person skilled in the art.

The composite product preferably comprises at least 20% by weight of fillers, advantageously between 30 and 90%, preferably between 50 and 85%.

The composite product preferably comprises 10 to 40% of thermoplastic polymers or elastomers which are insoluble in aqueous and/or organic solvents and 5 to 40% of polymers which are soluble in aqueous and/or organic solvents.

More preferably, the composite product comprises:
10 to 40% of polyolefin,
5 to 40% of polyether,
fillers, q.s. for 100%.

Another characteristic of the porous composite product according to the invention lies in the fact that it is provided in a homogeneous and even form, that is to say that the fillers are intimately mixed with the polymeric material, unlike, for example, the sheets obtained by coating a mixture of carbonaceous fillers with a small proportion of binding polymer of the polytetrafluoroethylene type.

The composite products according to the invention can be provided in the form of a film and exhibit the advantage of being able to be employed using spooling technology.

These films avoid the use of a support.

The invention also relates to a process for the preparation of a composite product as described above, characterized in that:
a) a mixture comprising one or more insoluble polymers, one or more soluble or calcinable polymers and one or more fillers with a high specific surface is formed,
b) the said mixture is extruded, so as to form an extruded precursor product,
c) the soluble or calcinable polymer or polymers is/are removed from the extruded precursor product,
d) the porous composite product is recovered.

The said process is therefore an extrusion-removal process which makes it possible to obtain a porous composite product-with a high specific surface.

The expression "removed" is intended to indicate that a substantial portion of the soluble or calcinable polymers is eliminated in order to form pores, it being understood that it is not very probable that these polymers will be completely removed, due in particular to their affinity for the active charcoal.

In phase a) of the process, all the constituents, namely one or more solvent-insoluble polymers which correspond to the polymeric material forming the structure of the composite product, one or more other solvent-soluble or calcinable polymer or polymers and one or more fillers with a high specific surface, are homogeneously mixed, whether by dissolving or suspending, it being known that the polymers ensuring the cohesion of the composite product (insoluble polymers) and the fillers with a high specific surface are not removed during stage c). The mixing can also be carried out by means of the extruder which allows stage b) to be carried out.

From among the soluble polymers which will be removed during stage c) may be chosen any soluble polymer which can be mixed according to stage a) and mention is in particular made of polymers which are soluble, for example, in water, alcohols, dimethylformamide, dimethyl sulfoxide, tetrahydrofuran or acetone.

With the proviso, of course, that the degree of polymerization is appropriate to removal by solvent, the soluble polymers are chosen in particular from polyethers, such as polyoxyethylene or polyoxypropylene, or polyalcohols, such as poly(vinyl alcohol) or ethylene/vinyl alcohol copolymers.

Mention is also made, by way of polymers which can be removed in order to form pores, of polymers which can be calcined according to the usual methods.

The calcinable polymers can be chosen from polymers with a decomposition temperature below that of the structural polymer or elastomer, for example cellulose.

The choice of these polymers can be made in a known way by simple tests within the scope of a person skilled in the art.

The various constituents of the product are mixed at an appropriate temperature, in particular by means of an extruder. In this case, stages a) and b) are carried out simultaneously in order to give an intermediate precursor product exhibiting a very low BET specific surface (less than approximately 1 $m^2/g$).

The precursor product can be re-extruded in the form of a film, in particular a thin film with a thickness of less than approximately 300 $\mu$m.

According to an advantageous alternative form, stage b) is therefore carried out in two stages:
a first extrusion stage (i) consisting in forming granules,
a second extrusion stage (ii) consisting in forming a film.

The first stage is advantageously carried out in a corotating twin-screw extruder, with a rod die for example, whereas the second stage is advantageously carried out in a single-screw extruder with a flat die.

The extruded precursor product, either in the form of granules or in the form of films, is subsequently subjected to the removal stage c) in which the soluble polymer is eliminated.

This removal stage can be carried out in particular by dissolving the soluble polymer by bringing it into contact with an appropriate solvent.

A calcination can also be carried out according to a known process which consists in slowly raising the temperature up to the decomposition temperature of the polymer to be removed.

The products are subsequently recovered and exhibit a "BET" specific surface of greater than approximately 10 $m^2/g$, preferably of greater than approximately 20 $m^2/g$.

Another subject-matter of the invention is therefore the porous composite products with a high specific surface formed of a polymeric material and of one or more fillers with a high specific surface, characterized in that they are capable of being obtained by the extrusion-removal process as described above.

Another subject-matter of the present invention is the precursor products obtained before the removal stage, these precursor products, of use in particular in carrying out the process described above, comprise one or more solvent-insoluble polymers, one or more other solvent-soluble or calcinable polymers and one or more fillers with a high specific surface.

The insoluble polymers/soluble or calcinable polymers ratio by weight is preferably between 0.1 and 5, advantageous 0.1 and 2.

The proportion of fillers with a high specific surface in the solvent-free mixture leading to the precursor product is preferably between 20 and 60% by weight.

The invention also relates to an electrode in the form of a film, which electrode is formed of a porous composite product with a high specific surface according to the invention.

These electrodes in the form of porous films can generally be used for the production of electrochemical chemical assemblies, such as accumulators, double-layer capacitors or supercapacitors.

The supercapacitors are formed in a known way of two polarizable electrodes and of a separator impregnated with an electrolyte. These assemblies are also denoted by the term "electrolytic double-layer capacitor".

The electrodes according to the invention greatly improve the capacity of the films, in particular by the very high proportion of active mass which can be obtained.

Particular mention is made of the following fields of applications:

Porous electrodes for the electrochemical storage of energy [electrochemical generators, redox accumulators, air accumulators, electrochemical supercapacitors or double-layer capacitors, or fuel cells].

Porous electrodes for electrodialysis processes [production of drinking water, production of salt from sea water, demineralization of organic products (wheys, milk, wine, and the like), desalination of water for consumption, softening of boiler water or decontamination of nuclear power station effluents].

Porous electrodes for capacitive deionization processes [production of drinking water, production of salt from sea water, demineralization of organic products (wheys, milk, wine, and the like), desalination of water for consumption, softening of boiler water or decontamination of nuclear power station effluents].

Porous electrodes for electrolysis processes [production of chlorine and sodium hydroxide, electrolysis of water or production of acid and a base from a salt].

Electromembranes for dialysis and electrodialysis processes [production of drinking water, production of salt from sea water, demineralization of organic products (wheys, milk, wine, and the like), desalination of water for consumption, softening of boiler water or decontamination of nuclear power station effluents].

Electromembranes for filtration processes [selective electrofiltration of organic products or microfiltration].

The invention also relates to the application of these composite products in the form of granules or films:

to methods for filtration and for adsorption, for example dehumidification of gaseous or liquid surroundings, selective adsorption (physical and/or chemical), molecular sieves or filtration of polluted air, to catalysis, to energy exchanges (for example, thermal or sound insulation or heat exchangers), to packaging, in particular the packaging of delicate products requiring selective permeability.

The invention is now illustrated by the following examples, given by way of indication:

EXAMPLE 1

The proportions by mass of the starting compounds (powders) are as follows:

40% active charcoal (with a specific surface of 1250 $m^2/g$)

20% ethylene-propylene copolymer

40% polyoxyethylene (POE 300,000).

The combined powdered constituents are mixed as homogeneously as possible by mixing by means of a corotating twin-screw extruder with a length of 40D and with two kneading regions and three transportation regions. The device used is a twin-screw with a diameter of 58 mm and the temperature profile used is as follows:
50/120/120/110/110/100/100/120/120/150/170.

Die pressure: 8 MPa

Number of revolutions per minute: 85

Throughput: 34 kg/h.

The granules obtained are introduced into a single-screw with a length of 30D for extrusion of a primary mixture. The device used is a twin-screw with a diameter of 30 mm and the temperature profile used is as follows:
165/170/170/170/185° C.

Die pressure: 8 MPa

Number of revolutions per minute: 10

Throughput: 2 kg/h.

The film obtained has a thickness of 200 $\mu$m.

The following stage consists in immersing the film obtained in water at room temperature for a residence time of 5 minutes. The film is then dried at 40° C. for 1 hour.

The mean proportions by mass of the compounds after treatment are as follows:

52% active charcoal

26% ethylene-propylene copolymer

22% polyoxyethylene.

It is possible to metallize with aluminum (for example: 0.5 Ω/□ the films obtained, before or after treatment, in a metallizing device at a pressure of the order of 0.01 Pa (10-4 mbar).

The physical characterization of the films obtained, metallized or otherwise, results in the following data:

elongation at break (see table below)

spooling tension (core with a diameter of 6 mm): 0.05 g/$\mu$m/mm electrochemical capacity of 26 F/g of electrode (measured via the slope of the discharge curve of the supercapacitor, in galvanostatic mode)

"BET" specific surface of less than 1 m²/g of film at the outlet of the extrusion and "BET" specific surface of 28 m²/g of film after passing into water according to the method which consists in immersing the electrode for approximately five minutes.

EXAMPLE 2

The proportions by mass of the starting compounds (powders) are as follows:

40% active charcoal (with a specific surface of 1250 m²/g)

10% ethylene-propylene copolymer

50% polyoxyethylene (POE 300,000).

The combined powdered constituents are mixed as homogeneously as possible by mixing by means of a corotating twin-screw extruder with a length of 25D and with two kneading regions and three transportation regions. The device used is a twin-screw with a diameter of 19 mm and the temperature profile used is as follows: 160/170/180/190/200° C.

Die pressure: 10.5 MPa

Number of revolutions per minute: 400

Throughput: 1.8 kg/h.

The granules obtained are introduced into a single-screw with a length of 30D for extrusion of a primary mixture. The device used is a twin-screw with a diameter of 30 mm and the temperature profile used is as follows: 160/170/180/190/220° C.

Die pressure: 17.5 MPa

Number of revolutions per minute: 15

Throughput: 2.5 kg/h. The film obtained has a thickness of 180 µm.

The next stage consists in immersing the film obtained in water at room temperature for a residence time of 5 minutes. The film is then dried at 40° C. for 1 hour.

The mean proportions by mass of the compounds after treatment are as follows:

60% active charcoal

15% ethylene-propylene copolymer

25% polyoxyethylene.

It is then possible to metallize with aluminum (for example: 0.5 Ω/☐ the films obtained in a metallizing device at a pressure of the order of 0.01 Pa (10$^{-4}$ mbar).

The physical characterization of the films obtained, metallized or otherwise, results in the following data:

elongation at break (see table below)

spooling tension (core with a diameter of 6 mm): 0.05 g/µm/mm electrochemical capacity of 26 F/g of electrode according to the method described in Example 1

"BET" specific surface of less than 1 m²/g of film at the outlet of the extrusion and "BET" specific surface of 60 m²/g of film after passing into water according to the method described in Example 1.

| Mechanical characterization measurement of the films obtained | | | | |
|---|---|---|---|---|
| Temperature | Film | Elongation at break (%) | Modulus of elasticity (Dn/mm²) | Force (Mpa) |
| 20° C. | Example 1 | 0.97 | 134 | 8.3 |
| 20° C. | Example 2 | 0.89 | 170 | 9.3 |
| 40° C. | Example 1 | 1.14 | 88 | 6.1 |
| 40° C. | Example 2 | 1.20 | 125 | 7.2 |
| 60° C. | Example 1 | 5.73 | 22 | 2.0 |
| 60° C. | Example 2 | 1.68 | 30 | 2.6 |

EXAMPLE 3

The proportions by mass of the starting compounds (powders) are as follows:

40% active charcoal (active charcoal with a specific surface of 1250 m²/g)

20% ethylene-propylene copolymer

40% polyoxyethylene (POE 300,000).

The combined powdered constituents are mixed as homogeneously as possible by mixing by means of a corotating twin-screw extruder with a length of 40D and with two kneading regions and three transportation regions. The device used is a twin-screw with a diameter of 58 mm and the temperature profile used is as follows: 50/120/120/110/110/100/100/120/120/150/170.

Die pressure: 8 MPa

Number of revolutions per minute: 85

Throughput: 34 kg/h.

The next stage consists in immersing the granules obtained (2 mm/² mm) in water at room temperature for a residence time of 5 minutes. The film is then dried at 40° C. for 1 hour.

The mean proportions by mass of the compounds after treatment are as follows:

60% active charcoal

15% ethylene-propylene copolymer

25% polyoxyethylene.

The granules obtained exhibit an expanded surface of 30 m²/g.

What is claimed is:

1. A porous composite product with a homogeneous structure having a property that renders its self-supportive, the product being provided in the form of a film, exhibiting a "BET" specific surface greater than 10 m²/g and being formed of at least 20% by weight of at least one filler with the balance of the product being a non-fibrillated polymeric material, the said product being obtained by extrusion and having an open porous structure, wherein the at least one filler exhibits a specific surface greater than 1000 m²/g and the mean diameter of a plurality of pores of the porous composite product is less than 0.5 µm, wherein the polymeric material comprises elastomers or polymers selected from the group consisting of polyolefins, acrylic polymers, aromatic polymers, polyamides, polyimides, and vinyl polymers, wherein the polymeric material also comprises thermoplastic elastomers, soluble in polar organic solvents or water, which remain after the implementation of the manufacturing process, the thermoplastic elastomers selected from the group consisting of polyethers, poly(vinyl alcohol)s and ethylene-vinyl alcohol copolymers, and wherein the thermoplastic elastomers, soluble in polar organic solvents or water, which remain after the implementation of the manufacturing process include polyethers with a molecular mass of between 200,000 and 1,000,000.

2. The composite product according to claim 1, wherein the polymeric material comprises elastomers or polymers selected from the group consisting of polyethylenes, polypropylenes, and ethylene-α-olefin copolymers.

3. The composite product according to claim 1, wherein the composite product is 10 to 40% by weight of the polyolefin material, 5 to 40% by weight of the polyether, and the remainder is the at least one filler.

4. The composite product according to claim 1, wherein the filler is chosen from fillers with a high specific surface.

5. The composite product according to claim 4, wherein the at least one filler exhibits a specific surface of between 1000 and 3000 m$^2$/g.

6. The composite product according to claim 4, wherein the at least one filler is chosen from fillers composed of active charcoal, inorganic particles or metallic particles.

7. The composite product according to claim 1, wherein the polymeric material comprises elastomers or polymers selected from the group consisting of thermoplastic polymers or elastomers, soluble in polar organic solvents or water, which remain after the implementation of the manufacturing process.

8. A porous composite product with a homogeneous structure having a property that renders itself supportive, the product being provided in the form of a film, the product exhibiting a specific surface greater than 10 m$^2$/g and comprising between 30% and 85% by weight of at least one filler with the balance of the product being a non-fibrillated polymeric material, the product being obtained by extrusion and having an open porous structure, wherein the at least one filler exhibits a specific surface greater than 1000 m$^2$/g and the mean diameter of a plurality of pores of the porous composite product is less than 0.5 μm, wherein the polymeric material comprises elastomers or polymers selected from the group consisting of polyolefins, acrylic polymers, aromatic polymers, polyamides, polyimides, and vinyl polymers, wherein the polymeric material also comprises thermoplastic elastomers, soluble in polar organic solvents or water, which remain after the implementation of the manufacturing process, the thermoplastic elastomers selected from the group of consisting of polyethers, poly(vinyl alcohol)s and ethylene-vinyl alcohol copolymers, and wherein the thermoplastic elastomers, soluble in polar organic solvents or water, which remain after the implementation of the manufacturing process include polyethers with a molecular mass of between 200,000 and 1,000,000.

9. The composite product according to claim 8, wherein the polymeric material comprises elastomers or polymers selected from the group consisting of polyethylenes, polypropylenes, and ethylene-α-olefin copolymers.

10. The composite product according to claim 8, wherein the composite product is 10 to 40% by weight of the polyolefin, 5 to 40% by weight of the polyether, and the remainder is the at least one filler.

11. The composite product according to claim 8, wherein the at least one filler is chosen from fillers with a high specific surface.

12. The composite product according to claim 11, wherein the at least one filler is chosen from fillers composed of active charcoal, inorganic particles or metallic particles.

13. The composite product according claim 11, wherein to the at least one filler exhibits a specific surface of between 1000 and 3000 m$^2$/g.

14. The composite product according to claim 8, wherein the product includes 50 to 85% by weight of the at least one filler.

15. The composite product according to claim 8, wherein the product exhibits a "BET" specific surface of greater than 20 m$^2$/g.

16. The composite product according to claim 8, wherein the product in the form of a film exhibits a tensile strength at break of greater than 4 MPa.

17. The composite product according to claim 16, wherein the product exhibits a tensile strength at break of greater than 6 MPa.

* * * * *

UNITED STATES PATENT AND TRADEMARK OFFICE
CERTIFICATE OF CORRECTION

PATENT NO. : 6,962,745 B2  Page 1 of 1
APPLICATION NO. : 09/367081
DATED : November 8, 2005
INVENTOR(S) : Penneau et al.

It is certified that error appears in the above-identified patent and that said Letters Patent is hereby corrected as shown below:

Title Page, Item [75], Inventors, please delete "Avon" and insert -- Samoreau --

Title Page, Item [75], Inventors, please delete "Pleuven" and insert -- Anglet --.

Title Page, Item [75], Inventors, please delete "Melun" and insert -- Le Mee Sur Seine --.

Title Page, Item [87], PCT Publication Date, please delete "Feb. 5, 1998" and insert -- Aug. 13, 1998 --.

In Claim #13, Line # 1, please delete "to".

Signed and Sealed this

Twenty-third Day of October, 2007

JON W. DUDAS
*Director of the United States Patent and Trademark Office*